3 Sheets—Sheet 1.

M. T. HANCOCK.

ROTARY PLOW.

No. 11,257. Reissued Aug. 9, 1892.

WITNESSES:

F. H. Farmer

J. A. Walsh

INVENTOR

Milton T. Hancock, per C. H. W. Bradford,

ATTORNEYS.

M. T. HANCOCK.

ROTARY PLOW.

No. 11,257. Reissued Aug. 9, 1892.

WITNESSES:

F. W. Warner.

J. J. Walsh.

INVENTOR per Milton T. Hancock.

Geo. H. & W. J. Bradford,

ATTORNEYS.

M. T. HANCOCK.

ROTARY PLOW.

No. 11,257. Reissued Aug. 9, 1892.

WITNESSES:

F. W. Warner.

J. A. Walsh.

INVENTOR

Milton T. Hancock, per C. A. W. Bradford,

ATTORNEYS.

UNITED STATES PATENT OFFICE.

MILTON T. HANCOCK, OF SHREVEPORT, LOUISIANA.

ROTARY PLOW.

SPECIFICATION forming part of Reissued Letters Patent No. 11,257, dated August 9, 1892.

Original No. 463,047, dated November 10, 1891. Application for reissue filed July 6, 1892. Serial No. 439,181.

*To all whom it may concern.*

Be it known that I, MILTON TAYLOR HANCOCK, a citizen of the United States, residing at Shreveport, in the parish of Caddo and State of Louisiana, have invented certain new and useful Improvements in Rotary Plows, of which the following is a specification.

This invention relates to that class of sulky-plows in which a rotary plowing-disk or cutting-wheel is mounted diagonally to the line of draft on a suitable frame supported by carrying-wheels and an axle.

It consists in such an arrangement of the several parts that the tendency to side draft due to the pressure of the soil against the plow is effectually counteracted.

In my preferred construction the soil thrown out by the plow is received on an unbroken or solid convex surface of a dished or staggered guide-wheel and discharged at the rear, so as not to retard the operation of the machine.

Said invention will first be fully described, and then pointed out in the claims.

Figure 1:
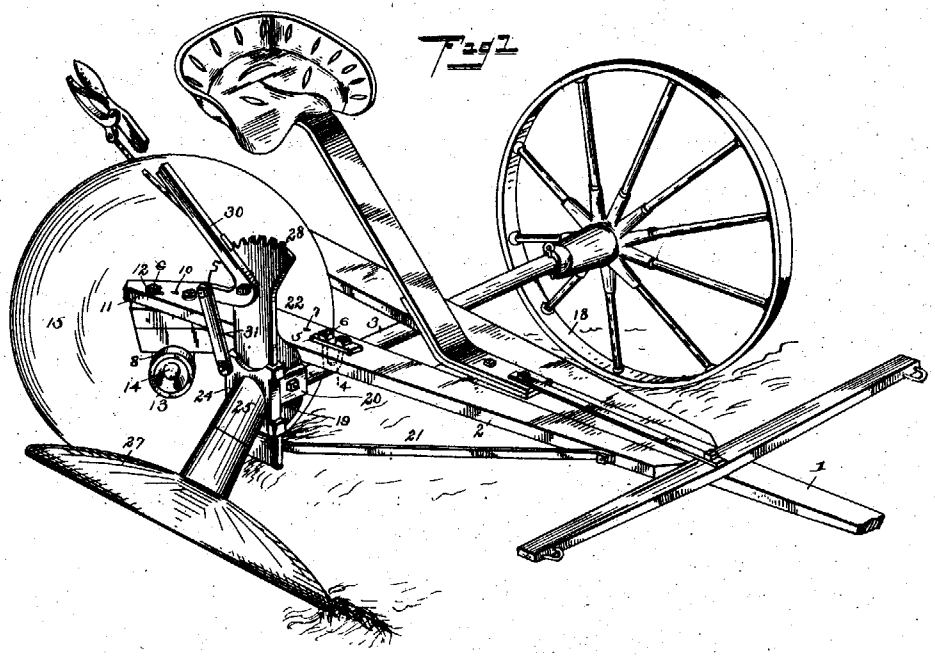
Figure 2:
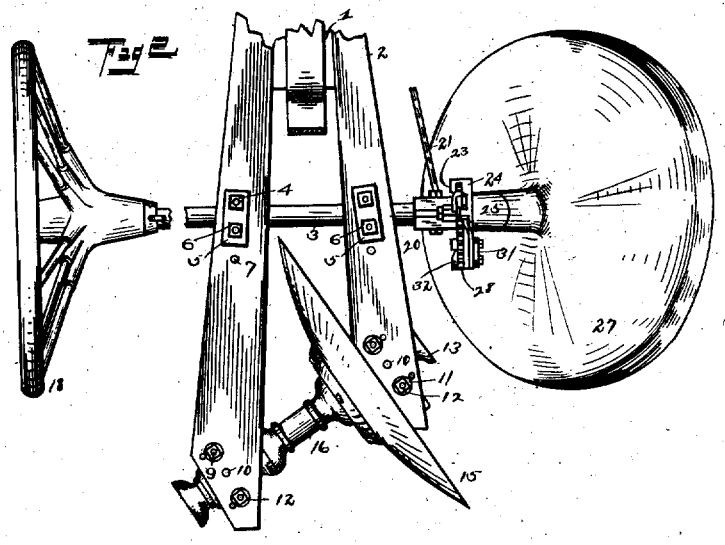
Figure 4:
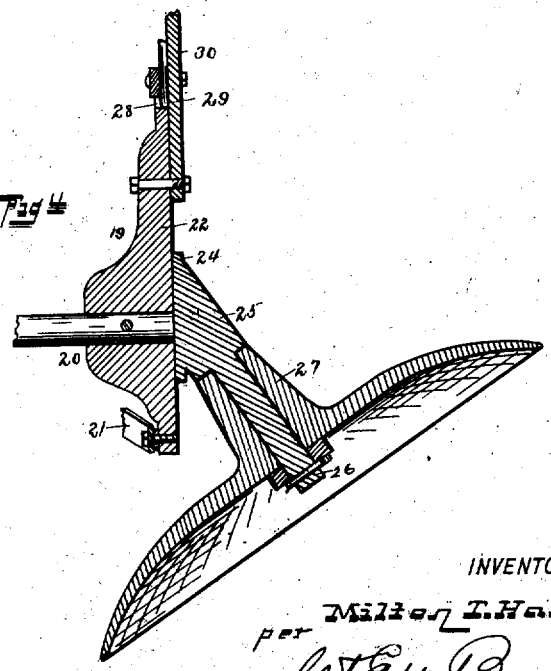
Figure 3:
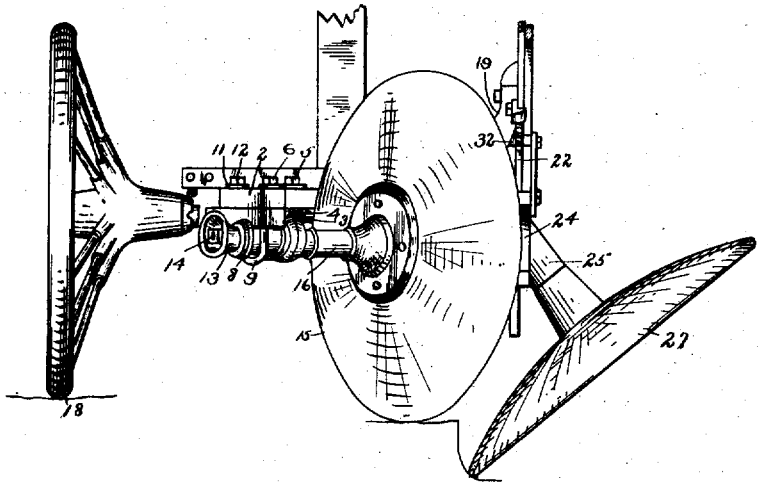
Figure 5:
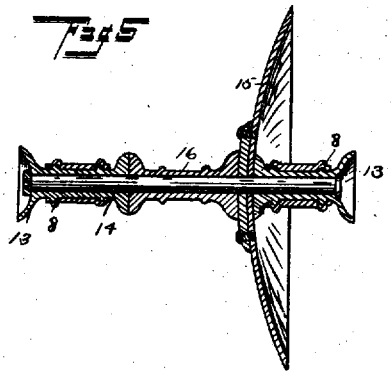

In the annexed drawings, illustrating the invention, Figure 1 is a perspective of a rotary sulky-plow embodying my improvements. Fig. 2 is a partial plan of the machine. Fig. 3 is a rear view of the machine. Fig. 4 is a vertical section through the lifting mechanism of the rotary plow, and Fig. 5 is a section through the rotary plow and its axle.

Referring to the drawings, the numeral 1 designates a draft-tongue, which is firmly secured to the forward ends of hounds 2, that constitute the frame of the machine. About midway their length the hounds 2 are adjustably attached to a straight axle 3 by means of clips 4, passed beneath the axle and through each hound, on the upper side of which they are secured by washers 5 and nuts 6, so that by loosening said nuts the frame of the machine can be adjusted laterally on the axle to give the required adjustment of the rotary plow toward or from the guide-wheel, and thereby vary the width of the furrow, as hereinafter explained. The hounds 2 may each be provided with a longitudinal series of holes or vertical perforations 7 for passage of the screw-threaded ends of the clips 4, so that by inserting said clips in the foremost or rearmost holes, as required, the frame of the machine may be adjusted rearward or forward, as desired.

To the under side of the rear ends of the hounds or frame-pieces 2 are attached adjustable obliquely-arranged journal-boxes 8 by means of clips 9, the upper screw-threaded ends of which are extended through holes or vertical perforations 10, formed in the hounds and secured by washers 11 and nuts 12 on the upper sides thereof. In the boxes 8 are supported rotary sleeves 13, through which is passed an obliquely-arranged bolt 14, on which, at the inner side of the right-hand hound, is mounted a dish-shaped rotary plow or cutting-wheel 15, with its concaved side turned outward and forward. On the bolt 14, adjacent to the convex side of the rotary plow 15, may be placed an intermediate sleeve 16, and on one end of the said bolt is a nut 17, which may be turned up tightly to draw the sleeves together, and thereby clamp the rotary plow securely onto the bolt 14, which, together with the sleeves 13 and 16, form an axle for said plow. The separate intermediate sleeve 16 may be dispensed with or made in one piece with the adjacent sleeve. It will be seen that the left-hand hound is of greater length and is extended somewhat in the rear of the right-hand hound, and also that the boxes 8, attached to the rear ends of said hounds, are placed obliquely, so that the rotary dished plow 15 will occupy a position diagonal to the line of draft. By providing a number of suitably-arranged vertical perforations 10 in the rear ends of the hounds 2 the clips 9 and obliquely-arranged boxes 8 can be so adjusted as to vary the diagonal position of the plow to secure a suitable width of cut.

On one end of the axle 3 is loosely mounted a land-wheel 18, which may, if preferred, be made dishing, as shown, for the purpose of obtaining strength and stability. To the other end of the axle 3 is securely bolted a vertical bracket 19, having on its inner side a horizontal socket 20, in which the end of said axle is received. The lower end of this bracket 19 is connected by a brace rod or bar 21 with the forward end of the adjacent hound, thereby securing the said bracket against the effects of strain. The outermost portion of the bracket 19 is in the form of a plate 22, which is engaged in vertical guides 23, that form a socket for said bracket 19 on the inner side of a casting or plate 24, the outer side of which is provided with a downwardly and outwardly inclined boss 25, having a fixed spindle 26, on which is loosely mounted a staggered and preferably solid and dished wheel 27, the tire or rim of which has an approximately sharp edge, which runs against the inner edge of the last-made furrow and serves as a guide for the rotary plow or cutting-wheel 15 in making the next adjacent furrow. It will be observed that the concave side of the dished and staggered guide-wheel 27 is turned downward and outward, while its convex side is presented toward the concave side of the dished rotary plow 15, and it will be further observed that by making the said guide-wheel 27 solid, as shown—that is, without spokes or ledges, but with a perfectly smooth and unbroken convex operative surface—the soil thrown thereon by the rotary plow will readily pass off at the rear of the machine without any liability of being carried forward to clog the operation of the wheel. One of the main features of my invention is the relative arrangement of this guide-wheel and the plowing-disk or cutting-wheel. As has already been stated, said plowing-disk is set diagonally to the line of draft and said guide-wheel is staggered or inclined outwardly. By reference to the drawings it will be observed that the axis of the plowing disk or disks is substantially coincident with a line passing therefrom across the furrow to above or near the bearing on which the guide-wheel turns, and thus the two points of strain are nearly or quite opposite to each other, and the resistance provided by the guide-wheel thus counteracts the strain of the plowing-disk occasioned by turning the furrow nearly or quite in direct line. This being so, what is known as "side draft" is practically eliminated from the operation of my machine, and the animals which draw the machine have little else to do except to furnish the necessary power to draw it forward, the labor of keeping it in line being inappreciable.

The upper segmental edge of the bracket-plate 22 is formed with a rack 28 for engagement of a pawl 29 on a hand-lever 30, that is pivoted to said bracket and formed with a lower rearwardly and upwardly curved end, which is connected by a link 31 with the socketed guide-plate or casting 24, on which the staggered and dished guide-wheel 27 is carried. It is obvious that by this construction and arrangement of parts the movement of the hand-lever 30 forward or backward will lower or raise the bracket-plate 22 in the guides 23 of the plate or casting 24, and thereby lower or raise the hounds 2 and attached rotary plow 15, as the case may be, to vary the depth of the furrow to be cut. By throwing the hand-lever back until the pawl 29 comes against a ledge or stop 32 on the inner side of the bracket-plate 22 the rotary plow will be raised entirely from the ground and remain inoperative while the machine is drawn from place to place.

The width of the furrows can be readily varied as required by adjusting the hounds 2 laterally on the axle 3, as already mentioned, it being only necessary to loosen the nuts 6 on the clips 4 in order to shift the position of the hounds, so as to carry the attached rotary plow 15 toward the guide-wheel 27, if it is desired to make a narrow furrow, or from said wheel to make a wide furrow, and then tighten the nuts 6, as before, to secure the parts in proper relative position for accomplishing the desired character of work. As before mentioned the width of the cut or furrow made by the rotary plow 15 can also be varied by increasing or diminishing the obliquity of the boxes 8, which is effected by removing the washers 11 and nuts 12 and changing the position of the clips 9 in the perforations 10 to hold the boxes 8 in the required position. By loosening the nuts 6 on the clips 4 and adjusting the hounds 2 forward or back the position of the rotary dished plow 15 will be changed to bring it into more or less direct action with relation to the adjacent staggered guide-wheel. By arranging this guide-wheel 27 in proximity to the rotary plow or cutting-wheel 15 in the relation above specified the tendency to side draft under the pressure exerted against the rotary plow will be entirely obviated and the machine will be caused to move properly and lay the furrows evenly in the desired direction. The operation of the plow is also greatly facilitated by making the staggered guide-wheel 27 in dishing form and with a solid unbroken convex surface presented toward the plow, so that the soil thrown onto said wheel will pass off freely and rapidly to the rear and not hinder the working of the machine. This relative arrangement of rotary plow and staggered guide-wheel having a solid convex surface also permits dispensing with a colter or rudder in rear of the plow, as frequently required in other forms of construction.

What I claim as my invention is—

1. In a sulky-plow, the combination, with a rotary plow or cutting-wheel and its supporting-frame, of an axle having a land-wheel at one end and a staggered dished guide-wheel mounted at the other end of said axle and having a solid and unbroken convex surface in proximity to said plow to receive the soil thrown onto it by the plow and discharge it at the rear, substantially as described.

2. The combination, with a diagonally-arranged rotary plow or cutting-wheel and its supporting-frame, of an axle on which said frame is laterally adjustable, a land-wheel at one end of said axle, and a staggered and dished guide-wheel mounted at the other end of the axle in proximity to the rotary plow and having a solid and unbroken convex surface presented toward said plow, substantially as described.

3. The combination, with an adjustable diagonally-arranged rotary plow or cutting-wheel and an adjustable frame on which said plow is mounted, of a solid and dished guide-wheel mounted in a staggered position adjacent to and outside the plow slightly in advance thereof and having a solid convex surface presented toward the plow to receive the soil and discharge it at the rear, substantially as described.

4. The combination of an axle having a land-wheel at one end and a staggered solid and dished guide-wheel at its other end, a frame laterally and longitudinally adjustable on said axle, and an adjustable and diagonally-arranged rotary plow mounted on said frame in rear of the axle, substantially as described.

5. The combination of an axle having a land-wheel at one end, a vertical bracket or plate secured to the other end of said axle and provided with a segmental rack, a plate or casting having guides engaged with said bracket and provided with a downward-inclined spindle, a solid dished and staggered guide-wheel mounted on said spindle, a lifting-lever and its pawl pivoted to the bracket and connected by a link to the guide-wheel plate, a frame mounted on the axle, and a diagonally-arranged rotary plow mounted at the rear end of said frame, substantially as described.

6. The combination of an axle having a land-wheel at one end, a vertically-adjustable bracket secured to the other end of said axle, a guide-plate in which said bracket is supported and provided with a downward-inclined spindle, a solid dished and staggered guide-wheel mounted on said spindle, a frame laterally adjustable on the machine-axle, and a diagonally-arranged rotary plow adjustably mounted at the rear end of said frame, substantially as described.

7. The combination of an axle having at one end a land-wheel and at the other end a solid dished and staggered guide-wheel, means for raising and lowering the last-named end of the axle with relation to the said guide-wheel, a frame adjustably mounted on the machine-axle, and a diagonally-arranged rotary plow mounted in adjustable obliquely-arranged boxes at the rear end of said frame, substantially as described.

8. In a rotary plow, the combination of the axle having an ordinary carrying-wheel on one end and a staggered wheel at the other end, a framework secured to said axle, and a plowing-disk mounted on said framework in the rear of said axle and faced toward said staggered wheel, whereby the sidewise pressure occasioned by the operation of said plowing-disk is counteracted by the substantially direct resistance of said staggered wheel.

9. In a rotary plow, the combination of an axle having an ordinary carrying-wheel upon one end and a smooth convex-surfaced and staggered guide-wheel at the other end, a framework supported by said axle, and a plowing-disk supported by said framework and arranged, as shown, to throw its furrow onto the convex surface of said staggered guide-wheel, said plowing-disk and said guide-wheel being positioned as shown and the sidewise pressure occasioned by the plowing thus effectually counteracted, while the earth of the furrow is discharged to the rear from the adjacent surfaces of said disk and wheel.

10. In a rotary plow, the combination of the axle having an ordinary carrying-wheel at one end and a staggered guide-wheel at the other end having an approximately sharp edge which rests in the bottom of the last preceding furrow which has been plowed, a framework secured to the axle, and the plowing disk mounted on the framework in the rear of the axle diagonally to the line of draft, with its axis substantially coincident to a line extending therefrom across the bearing of said staggered wheel, substantially as and for the purposes set forth.

In witness whereof I have hereunto set my hand, at Indianapolis, Indiana, this 28th day of June, 1892.

MILTON T. HANCOCK.

Witnesses:
CHESTER BRADFORD,
J. A. WALSH.